United States Patent [19]

Shibata et al.

[11] Patent Number: 4,939,381
[45] Date of Patent: Jul. 3, 1990

[54] POWER SUPPLY SYSTEM FOR NEGATIVE IMPEDANCE DISCHARGE LOAD

[75] Inventors: Mitsuhiro Shibata; Osamu Tanaka, both of Fuchu; Teruo Nakagawa, Hino, all of Japan

[73] Assignee: Kabushiki Kaisha Toshiba, Kawasaki, Japan

[21] Appl. No.: 346,460

[22] Filed: May 2, 1989

Related U.S. Application Data

[63] Continuation of Ser. No. 108,640, Oct. 15, 1987, abandoned.

[30] Foreign Application Priority Data

Oct. 17, 1986 [JP] Japan .................................. 61-246630
Nov. 6, 1986 [JP] Japan .................................. 61-262708

[51] Int. Cl.⁵ .......................................... H02M 3/337
[52] U.S. Cl. ........................................ 307/17; 315/201; 315/224; 315/307; 323/222; 363/17; 363/36; 363/98; 372/38; 372/81
[58] Field of Search ............... 315/146, 171, 172, 201, 315/205, 224, 307; 363/36, 37, 17, 80, 97, 98; 323/222; 372/25, 30, 38, 81, 31; 307/17

[56] References Cited

U.S. PATENT DOCUMENTS

| | | | |
|---|---|---|---|
| 3,733,543 | 5/1973 | Rettig | 363/36 |
| 4,549,256 | 10/1985 | Matthes | 363/37 |
| 4,716,569 | 12/1987 | Bees | 372/38 |
| 4,733,137 | 3/1988 | Dunham | 363/17 |

FOREIGN PATENT DOCUMENTS

| | | | |
|---|---|---|---|
| 176425 | 4/1986 | European Pat. Off. | 363/36 |
| 3446145 | 6/1986 | Fed. Rep. of Germany | 372/81 |
| 65492 | 4/1984 | Japan | 372/38 |
| 116184 | 6/1985 | Japan | 372/81 |
| WO85/01400 | 3/1985 | PCT Int'l Appl. | |
| 2173780 | 10/1984 | United Kingdom | 363/97 |
| 2154342 | 2/1985 | United Kingdom | |

Primary Examiner—William H. Beha, Jr.
Attorney, Agent, or Firm—Foley & Lardner, Schwartz, Jeffery, Schwaab, Mack, Blumenthal & Evans

[57] ABSTRACT

A power supply for negative impedance discharge loads such as discharge tubes used in gas laser systems, in which the discharge power is supplied not from the voltage source but from the current source through the current transformer so that stabilized and well balanced discharge currents can be supplied to a plurality of discharge loads.

5 Claims, 1 Drawing Sheet

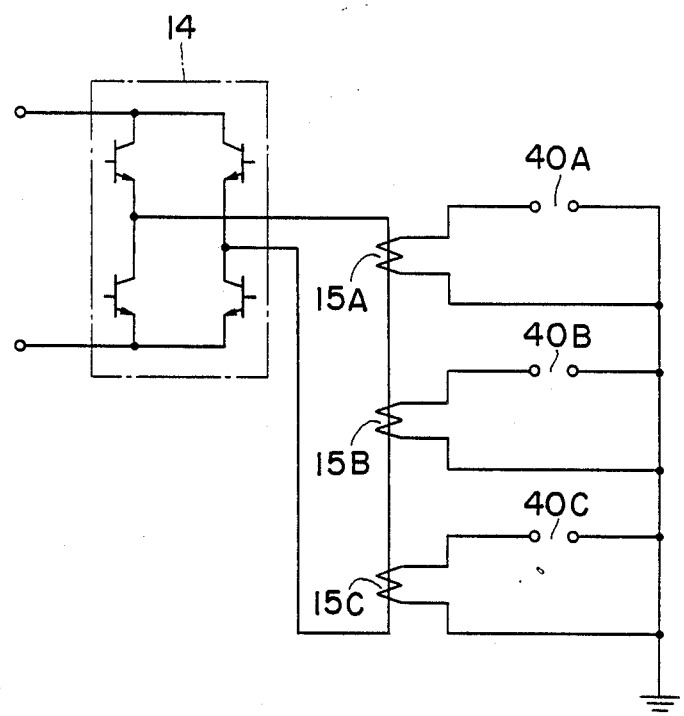
F I G. 5 rower SUPPLY SYSTEM FOR NEGATIVE
IMPEDANCE DISCHARGE LOAD

This application is a continuation, of application Ser. No. 07/108,640, filed Oct. 15, 1987, now abandoned.

BACKGROUND OF THE INVENTION

1. Field of the Invention

The present invention relates to a power supply system for a negative impedance discharge load for supplying the electric power to the discharge load such as a discharge tube used in gas laser systems.

2. Description of the Prior Art

A power supply system for discharge tubes for generating glow discharges in, for instance, a $CO_2$ laser system generally comprises a variable DC voltage source, an inverter, a step-up transformer and a ballast resistor.

As is well known in the art, the discharge tubes have a negative impedance characteristic and in order to convert the negative impedance into the positive impedance characteristic as viewed from the power supply system so as to ensure the stable generation of glow discharges, the ballast resistors are connected in series to the discharge tubes. In order to obtain a high laser beam output, a plurality of discharge tubes which generate glow discharges are connected in parallel while the ballast resistors are connected in series to the respective discharge tubes.

In the case of the AC discharge electrode devices, the above-mentioned inverter is so designed and constructed as to produce a high-frequency output and to apply a high-frequency AC voltage across a discharge electrode. Instead of the above-mentioned ballast resistor, a ballast capacitor is connected. In this case, a resistor having a relatively low value is connected in series to the ballast capacitor.

In the prior art power supply systems of the types described above, in order to maintain stable glow discharges, a ballast impedance must be connected to each discharge load such as a discharge tube, but the impedance drop or power loss across the ballast impedance inevitably results so that a power supply system capable of compensating for such an impedance drop or power loss must be provided. Furthermore, when the characteristics of a plurality of discharge loads or ballast impedances vary one from another, the unbalance among the discharge currents between the discharge loads results. As a result, a small current unbalance thus generated is enhanced due to the negative impedance of the discharge loads so that the increase in current flowing through a specific discharge load causes the unbalance of the voltages across the remaining discharge load and consequently the whole discharge loads cannot maintain stable discharges.

SUMMARY OF THE INVENTION

In view of the above, one of the objects of the present invention is to provide a power supply system for a negative impedance discharge load which can maintain the stable glow discharge across the discharge load without the use of any ballast impedance.

Another object of the present invention is to provide a power supply system for discharge loads which can distribute a balanced current to each of a plurality of discharge loads connected in parallel with each other.

To the above and other ends, the present invention provides a power supply system for a negative impedance discharge load comprising a DC source, an inverter for converting the direct current from the DC source into an alternating current, a current transformer for transforming the alternating current derived from the inverter at a desired level and supplying it to the discharge load and current control means for controlling the output current derived from the DC source at a predetermined level.

BRIEF DESCRIPTION OF THE DRAWINGS

In the accompanying drawings:

FIG. 5 is a fragmentary circuit diagram of a fourth preferred embodiment of the power supply system for discharge loads shown in FIG. 4.

DETAILED DESCRIPTION OF THE PREFERRED EMBODIMENTS

Figure 1:
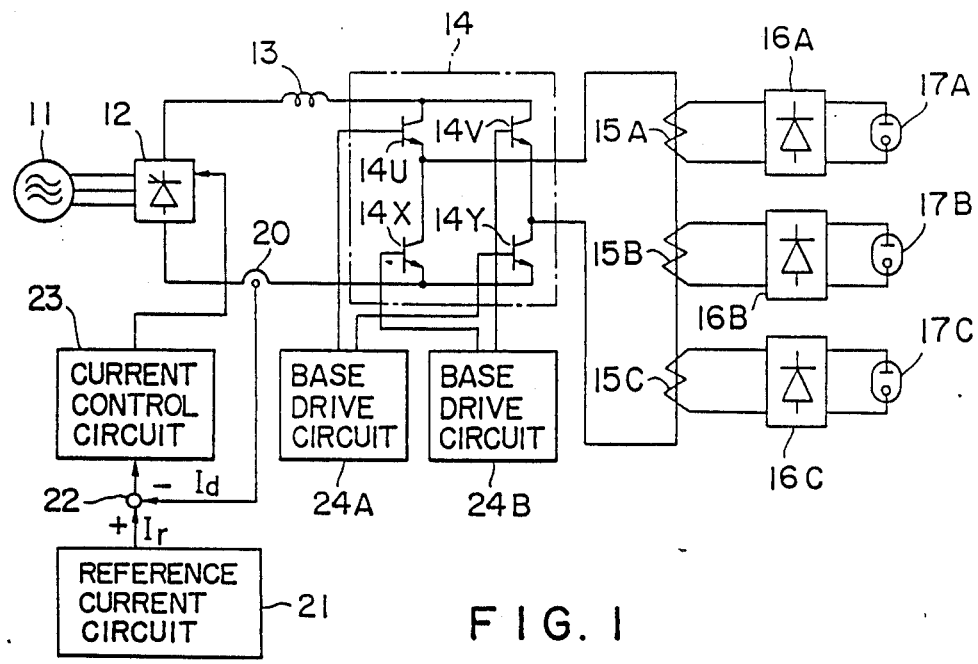
FIG. 1 is a circuit diagram of a first preferred embodiment of a power supply system for discharge loads in accordance with the present invention.

FIG. 1 is a circuit diagram of a basic embodiment in accordance with the present invention.

In FIG. 1, the AC power supplied from a commercial or local AC power supply is once converted into the DC power through a thyristor rectifier 12 and a reactor 13 and then converted into a high-frequency AC power by a current type inverter 14 consisting of transistors 14U, 14V, 14X and 14Y interconnected in the form of a bridge circuit. The primary windings of a plurality of current transformers (three transformers 15A, 15B and 15C in the first embodiment) are connected in series to the AC output side of the inverter. The secondary windings of the current transformers 15A, 15B and 15C are connected through rectifiers 16A, 16B and 16C, respectively, to discharge tubes 17A, 17B and 17C, respectively.

The reactor 13 has a considerably high degree of inductance and is capable of a high degree of smoothing function of the DC from the rectifier 12. Furthermore, it has a function of increasing the impedance on the side of the power supply as viewed from the load side. As a result, it has a function of converting the DC voltage source into the DC source.

The load current is detected as a direct current $I_d$ by a current detector 20 on the side of the DC output of the rectifier 12. In this case, a reference DC $I_r$ is supplied from a reference current circuit 21 and the deviation in current deviation between the reference current $I_r$ and the direct current $I_d$ is obtained by a subtractor 22. A current control circuit 23 controls the firing angle of the thyristor of the thyristor rectifier 12 in such a way that the output from the subtractor 22 becomes zero. In the inverter 14, a first pair of transistors 14U and 14Y which are disposed in diagonal relationship with each other are driven by a first base drive circuit 24A while a second pair of another diagonally disposed transistors 14V and 14X are driven by a second base drive circuit 24B.

According to the first preferred embodiment with the above-described circuitry, the current source having a high degree of impedance supplies the currents to respective discharge tubes 17A, 17B and 17C through the current type inverter 14, the current transformers 15A, 15B and 15C and the rectifiers 16A, 16B and 16C, respectively, through which flows the same first currents so that even when the discharge tubes 17A, 17B and 17C have a negative impedance characteristic, the equal and balanced currents can be supplied to the respective discharge tubes 17A, 17B and 17C in a stable manner without the use of any ballast impedance.

However, for instance, when the undesired glow discharge is produced in a laser oscillator, a tube voltage drops to a value which is extremely lower than that of the normal glow discharge voltage and consequently the discharge loads may be considered to be a short-circuit, but in the first embodiment the current type inverter is used so that even when the arc discharge is produced, the current is limited, whereby the rectifier element and the switching elements can be prevented from being damaged by current.

In the first embodiment, a plurality of parallel-connected discharge tubes are driven, but it is to be understood that the present invention may be equally applied to a tube in which a plurality of electrodes are disposed.

Figure 2:
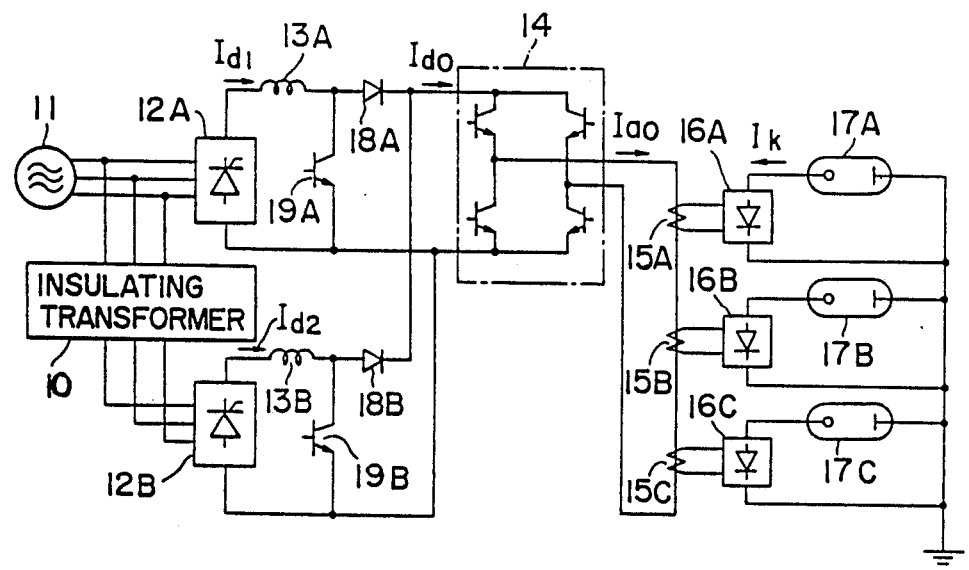
FIG. 2 is a circuit diagram of a second preferred embodiment of a power supply system for discharge loads in accordance with the present invention.

Referring next to FIG. 2, a second preferred embodiment of the present invention will be described. In FIG. 2, a current control system is not shown for the sake of simplicity of illustration. In the second embodiment, a rectifier 12A directly connected to the AC power source 11 constitutes a first DC power source while a second rectifier 12B connected through an insulating transformer 10 to the AC power source 11 constitutes a second DC power source. The DC outputs of the reactors 13A and 13B are connected through reverse-current blocking diodes 18A and 18B, respectively, to the DC input of the inverter 14. Furthermore, the DC outputs of the first and second rectifiers 12A and 12B are connected through the reactors 13A and 13B, respectively, to shunt switches 19A and 19B each consisting of a transistor.

The arrangement of the circuit on the AC output side of the inverter 14 is substantially similar to that of the first embodiment shown in FIG. 1. The second preferred embodiment is different from the first embodiment in that one of the terminals (anodes) of the respective discharge tubes 17A, 17B and 17C are grounded in common.

In the second embodiment, as long as the shunt switches 19A and 19B are switched off, the direct currents from both the first and second rectifiers 12A and 12B are synthesized through the diodes 18A and 18B and then applied to the inverter 14. On the other hand, when the shunt switches 19A and 19B are switched on, the direct currents $I_{d1}$ and $I_{d2}$ from the rectifiers 12A and 12B are shunted through the reactor 13A and 13B so that no current flows through the diodes 18A and 18B. As a consequence, in response to suitable combinations of an adjustment of the DC outputs of the rectifiers 12A and 12B and "ON" and "OFF" states of the shunt switches 19A and 19B, the level of the input current applied to the inverter 14 may be determined at various levels.

Figure 3:
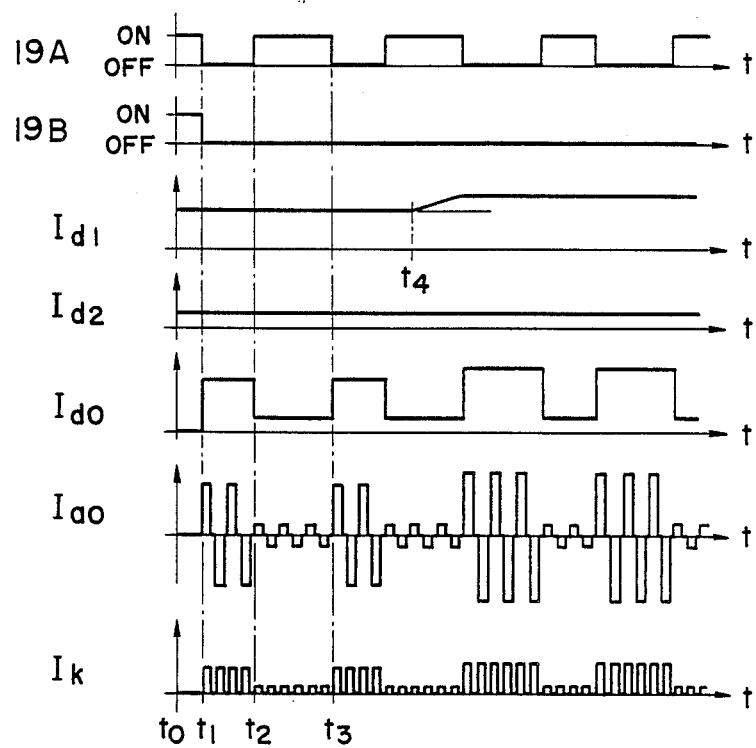
FIG. 3 is a time chart used to explain the mode of operation of the second preferred embodiment as shown in FIG. 2.

Referring next to FIG. 3, the mode of operation of the second embodiment as shown in FIG. 2 will be described in detail below.

As shown in FIG. 2, the output current from the rectifier 12A is represented by $I_{d1}$; that from the rectifier 12B, by $I_{d2}$; the input current applied to the inverter 14, by $I_{d0}$; and the discharge current from each discharge tube, by $I_k$.

FIG. 3 shows a case in which the output current $I_{d1}$ from the rectifier 12A is greater than the output current $I_{d2}$ from the rectifier 12B. As is easily understood from FIG. 2, when both the shunt switches 19A and 19B are switched on (for a time interval from $t_0$ to $t_1$), $I_{d0}=0$ so that $I_{a0}$ and $I_k$ are zero. On the other hand, when both the shunt switches 19A and 19B are switched off (for a time interval from $t_1$ to $t_2$), $I_{d0}=I_{d1}+I_{d2}$ flows into the inverter 14 so that the output current $I_{a0}$ corresponding to an output frequency of the inverter 14 flows and consequently the current $I_k$ corresponding to the output current $I_{a0}$ flows through each discharge tubes. When one of the shunt switches 19A and 19B is switched on while the other is switched off or more particularly when the shunt switch 19A is switched on while the shunt switch 19B is switched off (during a time period from $t_2$ to $t_3$), $I_{a0}=I_{d2}$ and relatively low currents $I_{a0}$ and $I_k$ corresponding to the condition of $I_{d0}=I_{d2}$ flow. For instance, the output-current set point of the rectifier 12A or 12B (12A in this embodiment) is varied at time point $t_4$, then the current corresponding to the varied output current is obtained from the inverter 14.

Referring still to FIG. 3, it is seen that the output current $I_{a0}$ from the inverter 14 and the discharge current $I_k$ have slits (no-current intervals). These slits correspond to "safety time intervals" for which all the switching elements of the inverter 14 are switched on so that the inverter 14 is prevented from being switched into the OPEN state when viewed from the power source side.

Referring back to FIG. 2, both the rectifiers 12A and 12B receive the AC inputs from the common AC power supply 11, but it is to be understood that the rectifiers 12A and 12B may be connected to independent AC power sources, respectively.

In the first and second embodiments shown in FIGS. 1 and 2, the AC power source 11, the rectifier 12 and the reactor 13 constitute one variable DC power source while the AC power source 11, the rectifiers 12A and 12B and the reactors 13A and 13B constitute two variable DC sources. However, such DC power sources may be replaced with other circuits. For instance, the AC power source and the rectifier can be replaced with a DC generator and in some cases they may be replaced with a battery and a chopper.

Referring back to FIG. 2 again, the shunt switches are shown as being connected to both the rectifiers 12A and 12B, but it is to be understood that only one shunt switch may be used when a number of steps for varying the current is small. For instance, when both the rectifiers 12A and 12B are connected to the shunt switches as shown in FIG. 2, in response to the "ON" and "OFF" combinations of the shunt switches, it becomes possible to vary the value of the current by $4-1=3$ steps, but when only one rectifier 12A or 12B is connected to a shunt switch, the value of the current can be varied in two steps.

Figure 4:
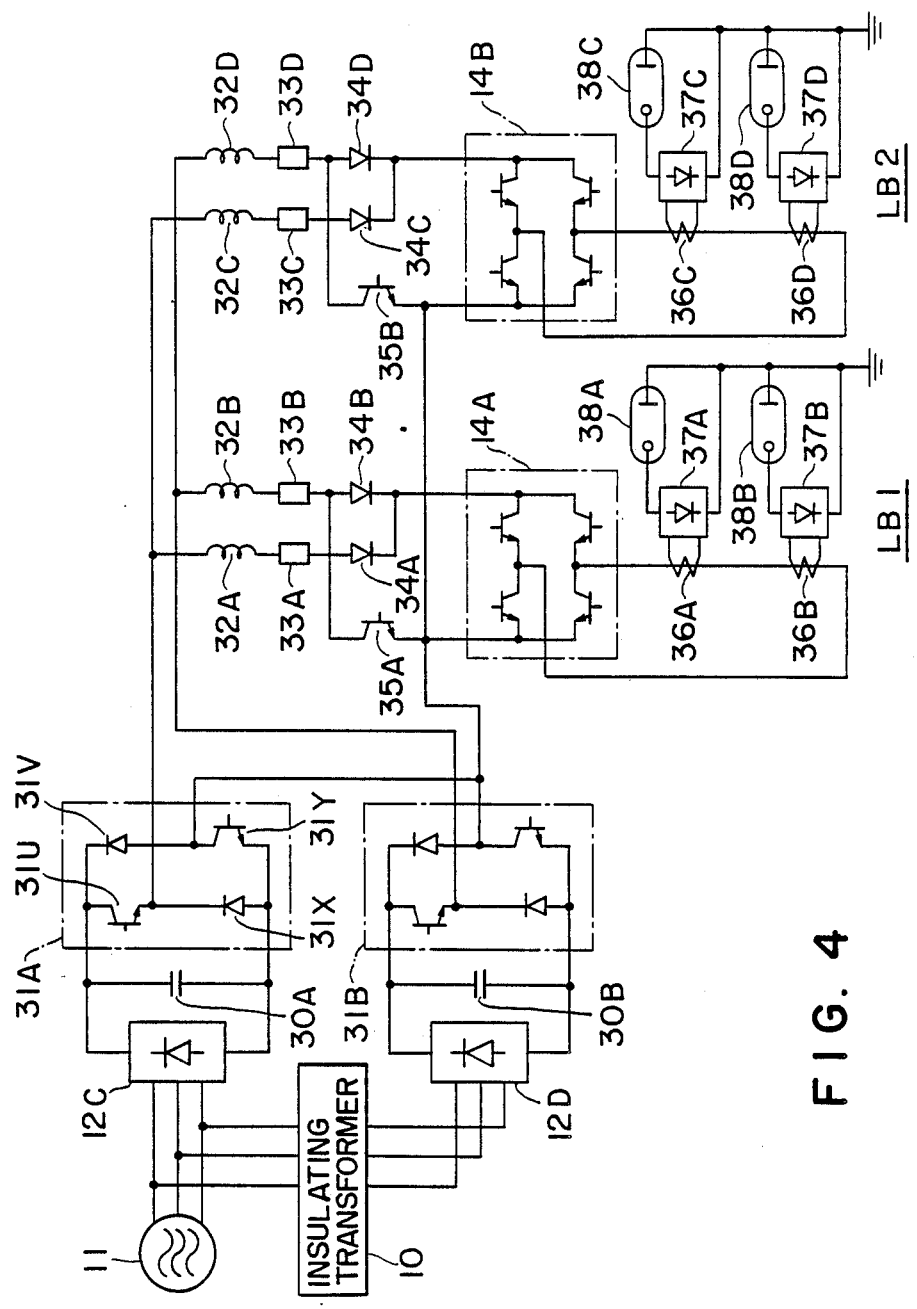
FIG. 4 is a circuit diagram of a third preferred embodiment of a power supply system for discharge loads in accordance with the present invention.

Referring next to FIG. 4, a third preferred embodiment of the present invention will be described in detail. In the third embodiment, the outputs of rectifiers 12C and 12D each consisting of a diode are connected to smoothing capacitors 30A and 30B, respectively, and to step-down choppers 31A and 31B, respectively, whose outputs are connected through reactors 32A, 32B, 32C and 32D, current balance resistors 33A, 33B, 33C and 33D and reverse-current blocking diodes 34A, 34B, 34C and 34D to the DC inputs of first and second inverters 14A and 14B. Shunt switches 35A and 35B are interconnected between the anode sides of the diodes 34B and 34D on the one hand and the common negative junction between the step-down choppers 31A and 31B on the other hand.

Each of the step-down choppers 31A and 31B comprises a pair of transistors 31U and 31Y and a pair of free-wheeling diodes 31V and 31X. The inverters 14A and 14B are substantially similar in construction to that shown in FIG. 1 or 2.

Current transformers 36A and 36B are connected in series to the AC output terminal of the first inverter 14A while current transformers 36C and 36D are connected in series to the AC output terminal of the second inverter 14B. The secondary windings of the current transformers 36A and 36B are connected through rectifiers 37A and 37B, respectively, to discharge tubes 38A and 38B, respectively. In like manner, the secondary windings of the current transformers 36C and 36D are connected through rectifiers 37C and 37D, respectively, to discharge tubes 38C and 38D.

In the third embodiment, the constant voltage output from the AC power supply 11 is converted into a variable DC voltage by the rectifiers 12C and 12D, the step-down choppers 31A and 31B and the shunt switches 34A and 34B and then the variable DC voltage is delivered to a suitable number of load blocks. Each load block refers in this specification to all the circuits connected to the inverter 14A or 14B connected through the reactors 32A and 32B or 32C and 32D and the current blocking diodes 34A and 34B or 34C and 34D (to the step-down chopper 31A or 31B). In the third embodiment, only two load blocks LB1 and LB2 are shown, but it is to be understood that any suitable number of load blocks may be connected.

According to the third embodiment, the stable currents flow through the load blocks and in each block, a balanced current flows through each discharge tube.

In the case of the construction as shown in FIG. 4, one circuit unit may be provided for each load block so that the load blocks may be increased or decreased in number in a simple manner.

So far the preferred embodiments of the present invention have been described in conjunction with the loads which are DC discharge tubes, but it is to be understood that the present invention may be equally applied to the case in which the electric power is supplied to AC discharge loads. In the latter case, the rectifier succeeding to the current transformer is eliminated.

FIG. 5 shows such embodiment as just described above and illustrates a fragmentary circuit diagram of the system for supplying the discharge current to the discharge electrodes 40A, 40B and 40C in a silent discharge type $CO_2$ laser instead of the direct current discharge tubes 17A, 17B and 17C as shown in FIG. 2. In this modification, instead of connecting the secondary windings of the current transformers 15A, 15B and 15C through the rectifiers, they are directly connected to the discharge electrodes 40A, 40B and 40C. Except the circuit block shown in FIG. 5, this modification is substantially similar in construction to the second embodiment described above with reference to FIG. 2. The underlying principle of this modification may be equally applied to the other embodiments in addition to the embodiment shown in FIG. 2. For instance, in the first embodiment shown in FIG. 1, the rectifiers 16A, 16B, and 16C can be eliminated while instead of the discharge tubes 17A, 17B and 17C, the discharge electrodes 40A, 40B and 40C are used. In like manner, in the third embodiment as shown in FIG. 4, the rectifiers 37A, 37B, 37C and 37D can be eliminated while the discharge tubes 38A, 38B, 38C and 38D may be directly connected to their corresponding current transformers. Even in the case of the AC discharge electrodes, a satisfactory current balance can be attained as in the case of using the DC tubes.

In the preferred embodiments described above, it has been described that one current transformer and one rectifier are provided for one discharge tube or one current transformer is provided for one discharge electrode. However, it is apparent to those skilled in the art now that the power supply systems in accordance with the present invention may be suitably modified. For instance, a single discharge tube may be connected to a plurality of rectifiers or a single rectifier or discharge electrode may be connected to the parallel-connected secondary windings of a plurality of current transformers.

The semiconductor devices which compose the rectifiers or inverters are not limited to those shown in the accompanying drawings. For instance, for the variable rectifiers provided on the input side of the inverters, the self-extinction type elements may be used. Furthermore, instead of the reactors inserted into the DC circuits, the series regulators may be used in which the base current of transistors are controlled. In any case described above, the satisfactory effects described above may be also attained. In addition, instead of the switching elements of the inverters, the self-extinction type elements for instance, gate-turn-off thyristors (GTO, Gate Turn Off) may be used in all the power supply systems for discharge loads in accordance with the present invention.

As is apparent from the third embodiment as shown in FIG. 4, the shunt switches interconnected between the rectifiers on the one hand and the inverters on the other hand are not needed for every rectifier and, for instance, in the second embodiment described above with reference to FIG. 2, the shunt switch 19B connected to the output terminal 21B may be eliminated if required. In short, the number of shunt switches which are selectively connected to desired rectifiers may be determined depending upon a desired number of current adjustment steps.

Moreover, when the secondary windings of a plurality of current transformers are provided for a plurality of discharge loads as described above, it has been described that a plurality of current transformers each with two windings are provided and that their primary windings are connected in series. However, it is to be understood that a plurality of secondary windings may be mounted on a common core. In the latter case, one primary winding is used or coupled in common with a plurality of secondary windings.

What is claimed is:

1. A power supply system for a negative impedance discharge load, said power supply system comprising:
   a direct current source, said direct current source including a plurality of direct current source units whose outputs are connected in parallel with each other through a reverse-current blocking diode circuit;
   reactor means connected in series to an output of said direct current source;

inverter means for converting direct current supplied from said direct current source through said reactor means into an alternating current;

current transformer means for transforming alternating current derived from said inverter means at a desired level and supplying transformed alternating current to said negative impedance discharge load; and current control means for controlling output current derived from said direct current source at a desired level.

2. A power supply system as set forth in claim 1, wherein at least one of said plurality of direct current source units has its output connected to a shunt switching means for shunting on the side of the power source side of said reverse-current blocking diode means.

3. A power supply system for a plurality of negative impedance discharge loads, said power supply system comprising:

a direct current source, said direct current source including a plurality of direct current source units whose outputs are connected in parallel with each other through a reverse-current blocking diode circuit;

reactor means connected in series to an output of said direct current source;

inverter means for converting direct current supplied from said direct current source through said reactor means into an alternating current;

current transformer means for transforming alternating current derived from said inverter means at a desired level and supplying transformed alternating current to said negative impedance discharge loads; and current control means for controlling output current derived from said direct current source at a desired level, wherein;

said current transformer means comprises a plurality of secondary windings, said secondary windings having a common primary current on the output side of said inverter means and each of said secondary windings being connected to one of said plurality of negative impedance discharge loads, respectively.

4. A power supply system as set forth in claim 3, wherein at least one of said plurality of direct current source units has its output connected to a shunt switching means for shunting on the side of the power source side of said reverse-current blocking diode means.

5. A power supply system for a plurality of negative impedance discharge loads, said power supply system comprising:

a direct current source, said direct current source including a plurality current source units whose outputs are connected in parallel with each other through a reverse-current blocking diode circuit;

reactor means connected in series to an output of said direct current source;

inverter means for converting direct current supplied from said direct current source through said reactor means into an alternating current;

current transformer means for transforming alternating current derived from said inverter means at a desired level and supplying transformed alternating current to said negative impedance discharge loads; and current control means for controlling output current derived rom said direct current source at a desired level, wherein;

said current transformer means comprises a plurality of secondary windings, said secondary windings having a common primary current on the output side of said inverter means and each of said secondary windings being connected to one of said plurality of negative impedance discharge loads, respectively; and said inverter means includes a plurality of inverters connected in parallel to said direct current source and the output side of each of said plurality of inverters is connected through a current transformer to a discharge load, respectively.

* * * * *